Aug. 27, 1929.  C. L. KENNEDY  1,726,230
INDUCTION MOTOR
Filed Oct. 15, 1926
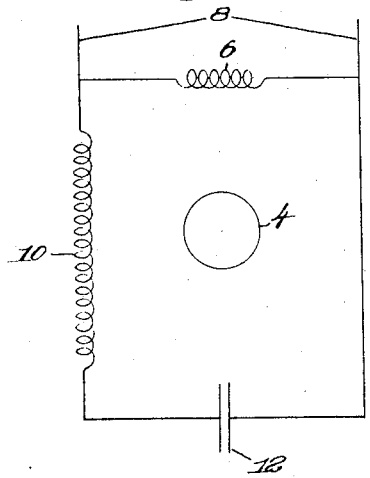
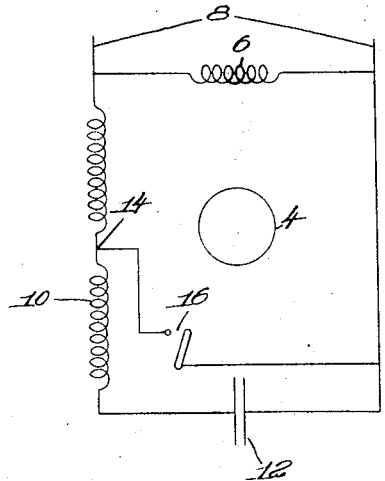

Patented Aug. 27, 1929.

1,726,230

UNITED STATES PATENT OFFICE.

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS.

INDUCTION MOTOR.

Application filed October 15, 1926. Serial No. 141,755.

The present invention relates to induction motors and more particularly to induction motors adapted to be operated from a single phase supply.

The object of the present invention is to provide a single phase induction motor in which the efficiency and power factors are higher than in the usual induction motor, and in which the permissible output of the motor is increased. To this end the invention consists in the induction motor hereinafter described and particularly defined in the claims.

In the accompanying drawings, Fig. 1 is a diagram of the circuit arrangement of the preferred form of induction motor, and Fig. 2 is a diagram of a modification for taking high starting torque.

The present invention consists of an induction motor having a rotor, a main or line stator winding and an auxiliary stator winding, which is connected in series with a condenser across the main stator winding. The auxiliary winding is displaced in position from the main stator winding preferably by an electrical angle of 90°. The arrangement is such that whereas the line winding takes a current which lags by a considerable angle, the auxiliary winding takes a current which leads the impressed voltage. The quadrature arrangement of the windings permits operation of the motor in a manner similar to a two phase motor increasing the power factor and efficiency and conducing to a more uniform starting torque. While condenser windings on induction motors are not new, the desirable results of the present invention are obtained by employment of proper magnitudes of the inductance of the condenser winding and of the capacity of the condenser. In order that the capacity of the condenser shall not be required to be too great, the number of turns on the auxiliary stator winding should considerably exceed the number of turns of the line winding, preferably by two to five times. Moreover, inasmuch as transformer action occurs under running conditions, there is induced in the auxiliary winding a voltage which may be several times the voltage of the supply, thus further permitting a decrease in the condenser capacity. The capacity is of such a magnitude that the terminal voltage across the auxiliary winding bears to the terminal voltage of the line winding a relation which is approximately equal to the ratio of turns of the windings. This terminal voltage across the auxiliary winding is made up of the voltage induced by transformer action in the winding under running conditions, together with the rise in voltage produced by the flow of leading current through the reactance inherent in the auxiliary winding, and the series condenser. When this condition obtains, it may be shown that both windings are doing equal amounts of work and the maximum desirable results are obtained.

Referring to Fig. 1, the motor comprises a rotor 4 which is of the squirrel cage type, together with a stator having a main winding 6 adapted to be connected directly to the line 8. Arranged on the stator at an angle of 90 electrical degrees from the main winding 6 is an auxiliary winding 10, having a considerably greater number of turns than the line winding 6, preferably two to five times as many turns. In series with the auxiliary winding 10 is a condenser 12, the winding 10 and condenser 12 being connected in series across the line winding 6. The magnitude of the condenser is such that the terminal voltage across the coil 10 is approximately equal to the terminal voltage across the coil 6 multiplied by the ratio of turns of the windings when the motor is running. Under this condition the motor operates substantially as a two phase motor giving its maximum efficiency and running torque. Moreover, the value of capacity is found to be somewhat less than that required for resonance, that is to say, the capacity reactance of the condenser circuit is greater than the inductive reactance, thus compensating for the lagging current of the line winding and improving the power factor.

It has been found, however, that a motor of the type illustrated in Fig. 1 in which the motor is of the low resistance squirrel cage type, has a low starting torque. This is due to the fact that at the high rotor frequency which occurs at starting, the rotor acts practically as a short circuited secondary and prevents the inducing of any material voltage in the auxiliary winding 10. In order to increase the starting torque, a feature of the invention contemplates the provision of a high resistance rotor. This rotor may consist of conductors which are smaller in size than the usual conductors, but is preferably formed with conductors of higher resistance than in the usual induction motor; thus brass may be used in place of copper. The rotor resistance may desirably be from two to four times the resistance of an ordinary induction motor designed for the same output. This increase in the rotor resistance is permissible because the condenser circuit consisting of the winding 10 and condenser 12 reduces the slip under running conditions sufficiently to compensate for the increased slip occasioned by the high resistance rotor. The increased resistance, therefore, greatly increases the starting torque, without detracting appreciably from efficient operation at running speed.

As a modified means for providing a high starting torque the arrangement of Fig. 2 may be employed. The rotor 4, line winding 6 and condenser 12 are as in the previously described construction, the rotor 4 being either of the low or high resistance type. The auxiliary winding 10, however, is tapped at a point 14, which is adapted to be connected to the opposite side of the line through a switch 16 for starting purposes. It will be seen that when the switch is closed, a portion only of the auxiliary winding is included in circuit with the supply, the remainder of the winding as well as condenser 12 being short circuited. The phase angle of the portion included in circuit must be different from the phase angle of the line winding 6, or, in other words, the ratios of resistance to inductive reactance in the two windings are different, thus producing currents of different phases in the two windings. As the motor comes up to speed, the switch 16 may be opened either manually or by any of the usual automatic switches in order to place the entire winding 10 and the condenser 12 across the line. The motor then operates similarly to the construction of Fig. 1.

Having thus described the invention, what is claimed is:

1. An induction motor having, in combination, a rotor, a stator having a line winding and an auxiliary winding displaced in space from each other, the auxiliary winding having a greater number of turns than the line winding, and a condenser in series with the auxiliary winding of a magnitude such that the ratio of terminal voltages across the auxiliary and line windings under running conditions is approximately equal to the ratio of turns of the windings.

2. An induction motor having, in combination, a rotor, a stator having a line winding and an auxiliary winding displaced in space from each other, the auxiliary winding having from two to five times the number of turns of the line winding, and a condenser in series with the auxiliary winding of a magnitude such that the ratio of terminal voltages of auxiliary and line windings under running conditions is approximately equal to the ratio of turns of the windings.

3. An induction motor having a high resistance rotor, a stator having line and auxiliary windings arranged in different space phase relations, and a condenser in series with the auxiliary winding of a magnitude such that the ratio of terminal voltages across the auxiliary and line windings under running conditions is approximately equal to the ratio of turns of the windings.

4. An induction motor having, in combination, a rotor, a stator having a line winding and an auxiliary winding displaced in space from each other, a condenser in series with the auxiliary winding, and a direct electrical connection between the auxiliary winding and the line having provision for cutting the condenser out of circuit for starting, the line and auxiliary windings having different ratios of resistance to reactance.

5. An induction motor having, in combination, a rotor, a stator having a line winding and an auxiliary winding displaced in space from each other and of different ratios of resistance to reactance, a condenser in series with the auxiliary winding, the auxiliary winding and condenser being connected across the line winding, and a switch for short circuiting a portion of the auxiliary winding and the condenser for starting.

6. An induction motor having, in combination, a rotor, a stator having a line winding, and a condenser circuit in parallel with the line winding, the condenser circuit including a condenser, an auxiliary stator winding electrically displaced from the line winding, and means for connecting in parallel to the line winding a non-capacitive circuit including turns of the auxiliary winding having a different ratio of reactance to resistance from the line winding for starting.

In testimony whereof I have signed my name to this specification.

CARLTON L. KENNEDY.